US012432553B2

(12) United States Patent
Onda (10) Patent No.: US 12,432,553 B2
(45) Date of Patent: Sep. 30, 2025

(54) COMMUNICATION APPARATUS, CONTROL METHOD OF COMMUNICATION APPARATUS, AND STORAGE MEDIUM STORING PROGRAM (71) Applicant: CANON KABUSHIKI KAISHA, Tokyo (JP)

(72) Inventor: Taiga Onda, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 529 days.

(21) Appl. No.: 17/741,051

(22) Filed: May 10, 2022

(65) Prior Publication Data
US 2022/0386121 A1 Dec. 1, 2022

(30) Foreign Application Priority Data
May 26, 2021 (JP) .................................. 2021-088228

(51) Int. Cl.
H04W 12/06 (2021.01)

(52) U.S. Cl.
CPC .................................. H04W 12/06 (2013.01)

(58) Field of Classification Search
CPC ........ H04W 12/06; H04L 63/08; H04L 63/20; H04L 63/10
See application file for complete search history.

(56) References Cited

U.S. PATENT DOCUMENTS

| | | | | |
|---|---|---|---|---|
| 8,751,612 B2 * | 6/2014 | Brewis | ................ | H04L 41/0806 709/220 |
| 10,271,215 B1 * | 4/2019 | Siraj | ..................... | H04W 12/03 |
| 2004/0218763 A1 | 11/2004 | Rose | | |
| 2005/0148326 A1 * | 7/2005 | Nogawa | ................... | H04W 8/22 455/420 |
| 2006/0149858 A1 * | 7/2006 | Bhesania | ............ | H04W 12/062 710/5 |
| 2007/0271398 A1 | 11/2007 | Manchester | | |
| 2008/0086760 A1 * | 4/2008 | Jiang | ..................... | H04L 67/303 709/225 |

(Continued)

FOREIGN PATENT DOCUMENTS

| | | |
|---|---|---|
| CN | 1798020 A | 7/2006 |
| JP | 2011211496 A | 10/2011 |
| JP | 2019-212242 A | 12/2019 |

OTHER PUBLICATIONS

K. Moissinac, D. Ramos, G. Rendon and A. Elleithy, "Wireless Encryption and WPA2 Weaknesses," 2021 IEEE 11th Annual Computing and Communication Workshop and Conference (CCWC), NV, USA, 2021, pp. 1007-1015. (Year: 2021).*

(Continued)

Primary Examiner — Kari L Schmidt
(74) Attorney, Agent, or Firm — Canon U.S.A., Inc. IP Division (57) ABSTRACT If an authentication type parameter included in a communication setting stored in a storage unit indicates that the WPA and WPA2 standards and the WPA3 standard upward compatible therewith are supported, a communication apparatus replaces the authentication type parameter with an authentication type parameter indicating that the WPA3 standard is not supported and the WPA and WPA2 standards are supported, and outputs the communication apparatus including the replaced authentication type parameter.

5 Claims, 11 Drawing Sheets

(56) References Cited

U.S. PATENT DOCUMENTS

| | | | | |
|---|---|---|---|---|
| 2009/0222659 A1* | 9/2009 | Miyabayashi | ........ | H04L 9/3239 |
| | | | | 713/175 |
| 2011/0242983 A1* | 10/2011 | Saito | ........ | H04L 69/18 |
| | | | | 370/241 |
| 2011/0243058 A1* | 10/2011 | Yamada | ........ | H04W 12/069 |
| | | | | 370/315 |
| 2013/0235217 A1* | 9/2013 | Sekiguchi | ........ | H04N 1/0097 |
| | | | | 348/207.1 |
| 2014/0059351 A1* | 2/2014 | Braskich | ........ | H04W 12/04 |
| | | | | 713/171 |
| 2016/0179424 A1* | 6/2016 | Sato | ........ | G06F 3/0623 |
| | | | | 348/231.9 |
| 2018/0361434 A1* | 12/2018 | Rickey | ........ | B05B 12/02 |
| 2019/0303071 A1* | 10/2019 | Tsuji | ........ | G06F 3/1222 |
| 2019/0379800 A1 | 12/2019 | Kogure | | |
| 2020/0137568 A1* | 4/2020 | Takeuchi | ........ | H04W 12/03 |
| 2020/0372156 A1* | 11/2020 | Sayyed | ........ | G06F 21/577 |
| 2020/0383049 A1* | 12/2020 | Tellado | ........ | H04W 24/04 |
| 2020/0413403 A1* | 12/2020 | Umehara | ........ | H04W 4/50 |
| 2021/0306947 A1* | 9/2021 | Koizumi | ........ | H04N 1/00896 |
| 2021/0377024 A1* | 12/2021 | Shibata | ........ | H04L 9/3263 |
| 2022/0232459 A1* | 7/2022 | Lee | ........ | H04W 48/20 |
| 2022/0322353 A1* | 10/2022 | Yoshikawa | ........ | H04W 12/60 |
| 2022/0338004 A1* | 10/2022 | Shibata | ........ | H04W 12/069 |

OTHER PUBLICATIONS

E. Lamers, R. Dijksman, A. van der Vegt, M. Sarode and C. de Laat, "Securing Home Wi-Fi with WPA3 Personal," 2021 IEEE 18th Annual Consumer Communications & Networking Conference (CCNC), Las Vegas, NV, USA, 2021, pp. 1-8. (Year: 2021).*

Opaschi, Octav, and Radu-Daniel Vatavu. "Uncovering practical security and privacy threats for connected glasses with embedded video cameras." Proceedings of the ACM on Interactive, Mobile, Wearable and Ubiquitous Technologies 4.4 (2020): 1-26. (Year: 2020).*

* cited by examiner

| NETWORK AUTHENTICATION TYPE PARAMETER (COMPATIBLE) | CONNECTABLE BASED ON WPA2 STANDARD |
| --- | --- |
| | CONNECTABLE BASED ON WPA/WPA2 STANDARD |
| | CONNECTABLE BASED ON WPA2-ENTERPRISE STANDARD |
| | CONNECTABLE BASED ON WPA/WPA2-ENTERPRISE STANDARD |

402

| NETWORK AUTHENTICATION TYPE PARAMETER (INCOMPATIBLE) | CONNECTABLE BASED ON WPA3 STANDARD |
| --- | --- |
| | CONNECTABLE BASED ON WPA3-ENTERPRISE STANDARD |

403

| NETWORK AUTHENTICATION TYPE PARAMETER (NEED TO DETERMINE COMPATIBILITY) | CONNECTABLE BASED ON WPA2/WPA3 STANDARD |
| --- | --- |
| | CONNECTABLE BASED ON WPA/WPA2/WPA3 STANDARD |
| | CONNECTABLE BASED ON WPA2/WPA3-ENTERPRISE STANDARD |
| | CONNECTABLE BASED ON WPA/WPA2/WPA3-ENTERPRISE STANDARD |

| PASSWORD CHARACTER STRING LENGTH PARAMETER (COMPATIBLE WITH WPA2) | 8 TO 63 ASCII CHARACTERS |
|---|---|
| | 64 HEXADECIMAL DIGIT CHARACTERS |

502

| PASSWORD CHARACTER STRING LENGTH PARAMETER (USABLE ONLY WITH WPA3) | 1 TO 255 ASCII CHARACTERS |
|---|---|

COMMUNICATION APPARATUS, CONTROL METHOD OF COMMUNICATION APPARATUS, AND STORAGE MEDIUM STORING PROGRAM

BACKGROUND OF THE INVENTION

Field of the Invention

The present invention relates to a communication apparatus capable of performing wireless communication, a control method of a communication apparatus, and a storage medium storing program.

Description of the Related Art

Recent years have seen an increase in the number of communication apparatuses, such as digital cameras, video cameras, printers, and smartphones, having a wireless communication function. Such a communication apparatus can store a communication setting inputted by a user and perform wireless communication based on the stored communication setting.

The communication setting includes an authentication type parameter related to authentication of the wireless communication.

Some of the above communication apparatuses have a function of exporting and importing a communication setting. By using this function, such a communication apparatus can export a communication setting stored therein to another apparatus to allow the other apparatus to use the communication setting or can import a communication setting stored in another apparatus to use the communication setting.

In a case where an apparatus imports a communication setting from a different apparatus and uses the communication setting, setting compatibility between these apparatuses often becomes an issue. For example, if a new standard is added to the wireless security standards (for example, authentication types), there will coexist apparatuses supporting the new standard and apparatuses (legacy apparatuses) not supporting the new standard. Therefore, some method needs to be devised to use communication settings based on the new standard in the legacy apparatuses.

Japanese Patent Application Laid-Open No. 2019-212242 discusses a technique of ensuring consistency between apparatuses for importing and exporting a communication setting therebetween. Specifically, when an apparatus exports a communication setting to a different apparatus, the exporting apparatus provides the importing apparatus with setting version information. If the importing apparatus does not support the version indicated by the setting version information, the importing apparatus does not read the communication setting.

However, in accordance with this method discussed in Japanese Patent Application Laid-Open No. 2019-212242, there is a case where when a new standard is added, firmware needs to be changed so that a different model can determine a newly set version. In addition, in a case where a new standard is compatible with an old standard, there are cases where a model supporting the old standard cannot use a communication setting that is supposed to be usable therein.

The present invention is directed to enabling an apparatus to replace a part of a communication setting for wireless communication when outputting the communication setting so that a receiving apparatus can reliably use the communication setting.

SUMMARY OF THE INVENTION

According to an aspect of the present invention, a communication apparatus that performs wireless communication with an external apparatus includes a storage unit configured to store a communication setting including an authentication type parameter for the wireless communication, a replacement unit configured to replace, in a case where the authentication type parameter included in the communication setting stored in the storage unit indicates that both a first authentication type and a second authentication type that is upward compatible with the first authentication type are supported, the authentication type parameter with an authentication type parameter indicating that the second authentication type is not supported and the first authentication type is supported, and an output unit configured to output the communication setting including the authentication type parameter replaced by the replacement unit.

Further features of the present invention will become apparent from the following description of exemplary embodiments with reference to the attached drawings.

DESCRIPTION OF THE EMBODIMENTS

Hereinafter, an exemplary embodiment of the present invention will be described with reference to the accompanying drawings. The technical scope of the present invention is defined by the scope of claims and is not limited by the following individual exemplary embodiment.

System Configuration Example

Figure 1:
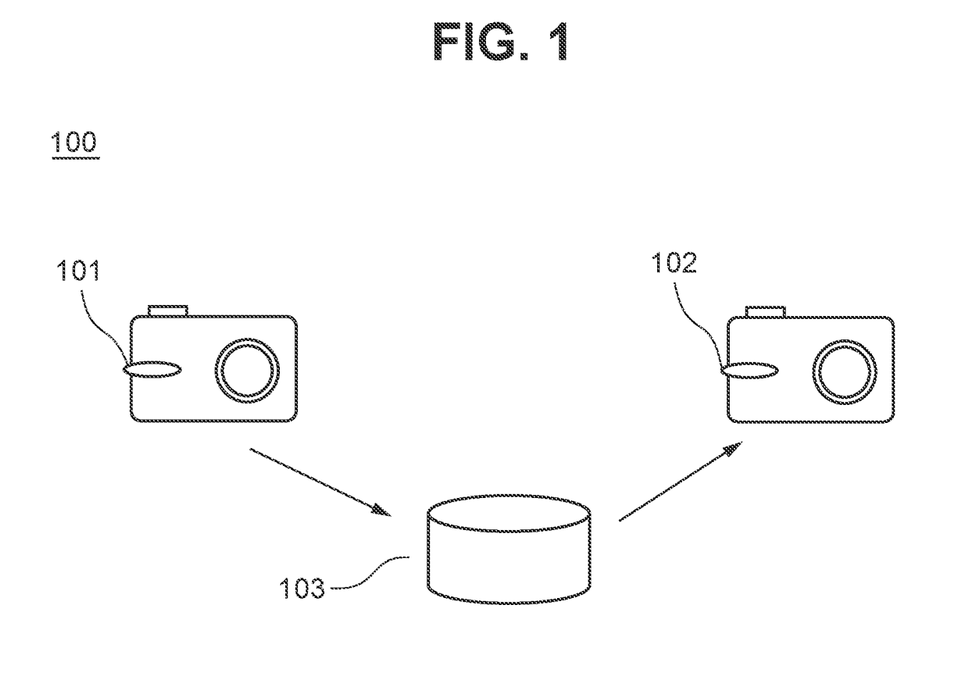
FIG. 1 illustrates an example of a system configuration.

A first exemplary embodiment will be described. FIG. 1 illustrates a configuration example of a system 100 as an example of a communication system according to the present exemplary embodiment. The present system 100 includes, for example, a digital camera 101, a digital camera 102, and a communication setting file 103 to which a communication setting is exported. While the digital camera 101 will be described as an example of a communication apparatus in the present exemplary embodiment, the present exemplary embodiment of the present invention is also applicable to various types of communication apparatuses (for example, a printer, a smartphone, etc.) other than a digital camera.

The present exemplary embodiment assumes that the digital cameras 101 and 102 each have a wireless communication function. The following description will be given assuming that the wireless communication function is a wireless local area network (LAN) function compliant with IEEE802.11 series. However, the wireless communication function is not limited thereto and may be a different wireless communication function such as Bluetooth®, Multi-band OFDM Alliance (MBOA), ultra wide band (UWB), ZigBee, or Near Field Communication (NFC). In addition, instead of wireless communication, wired communication based on a wired LAN, universal serial bus (USB) connection, or the like may be performed. Examples of UWB include a wireless USB, wireless 1394, and WINET.

The digital camera 101 has a function of generating the communication setting file 103, as one of its means for allowing the digital camera 102 to use a communication setting of the digital camera 101. The communication setting file 103 generated by this function is stored in a memory card attached to the digital camera 101. When the memory card is attached to the digital camera 102, the digital camera 102 reads the stored communication setting file 103. In this way, the communication setting file 103 is transferred between the digital camera 101 and the digital camera 102. Alternatively, the above-described wireless communication or wired communication may be used as means for outputting the communication setting to the outside via a network.

In the present system configuration, while the digital camera 102 will be described as an apparatus that reads the communication setting outputted by the digital camera 101 to the outside, more than one external apparatus may read the communication setting. That is, a plurality of digital cameras may import the communication setting by using the same communication setting file 103. In addition, a network may be established among apparatuses including the digital camera 102 by using the communication function described above, and the digital camera 101 may transmit the communication setting thereof to the plurality of other apparatuses via the network.

In the present exemplary embodiment, Wi-Fi Protected Access (WPA), WPA2, and WPA3 will be described as wireless security standards. The following description assumes an example in which the digital camera 101 supports not only the WPA and WPA2 standards, which correspond to a first encryption method, but also the WPA3 standard, which corresponds to a second encryption method, and the digital camera 102 only supports the WPA and WPA2 standards, not the WPA3 standard.

Configuration of Digital Camera

Figure 2A:
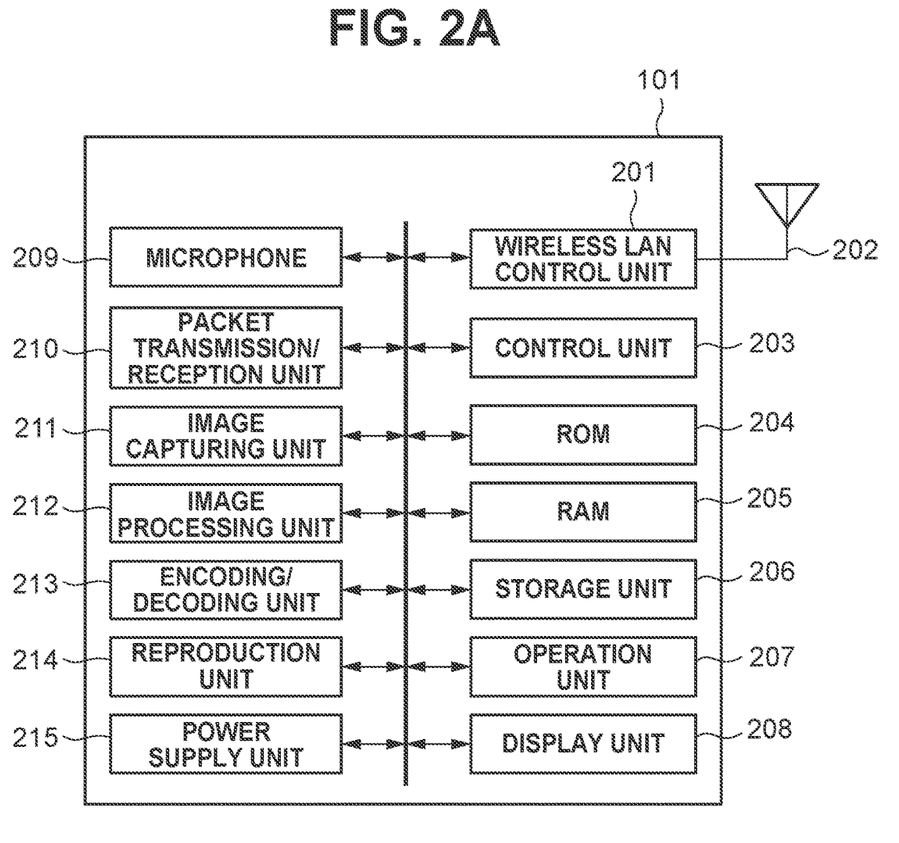
FIGS. 2A and 2B are each a block diagram illustrating an example of a configuration of a digital camera.

FIG. 2A illustrates a hardware configuration example of the digital camera 101 according to the present exemplary embodiment. A wireless LAN control unit 201 performs wireless LAN radio frequency (RF) control processing, wireless LAN communication processing, driver processing for performing various control processing of wireless LAN communication compliant with IEEE802.11 series, and protocol processing related to the wireless LAN communication. An antenna 202 is used for performing wireless LAN communication.

A control unit 203 comprehensively controls the digital camera 101 by executing a control program stored in a read-only memory (ROM) 204. The ROM 204 stores the control program executed by the control unit 203. The control unit 203 performs various operations, which will be described below, by executing the control program stored in the ROM 204. A communication setting to be stored in a digital camera is stored in the ROM 204.

A random access memory (RAM) 205 is used as a work memory when the control unit 203 executes the control program and uses temporarily store data. A storage unit 206 stores various kinds of information such as parameters for communication and compressed and encoded image data in a recording medium (not illustrated). An operation unit 207 is for operating the digital camera 101.

A display unit 208 displays various kinds of information and has a function of outputting visually recognizable information as in a liquid crystal display (LCD) or a light-emitting diode (LED) or a function of outputting sound as in a speaker. The operation unit 207 and the display unit 208 may be integrated as a single unit like a touch panel. The digital camera 101 also includes a microphone 209.

A packet transmission/reception unit 210 transmits and receives packets related to various kinds of communication. An image capturing unit 211 captures an optical image of an object. An image processing unit 212 converts a captured image outputted from the image capturing unit 211 into image data in a predetermined format and performs various kinds of processing such as correction of the brightness and color of the image data.

An encoding/decoding unit 213 performs predetermined high-efficiency encoding (for example, variable-length encoding after discrete cosine transform and quantization) on the image data outputted from the image processing unit 212. A reproduction unit 214 reproduces compressed and encoded image data. A power supply unit 215 supplies power to the digital camera 101.

Figure 2B:
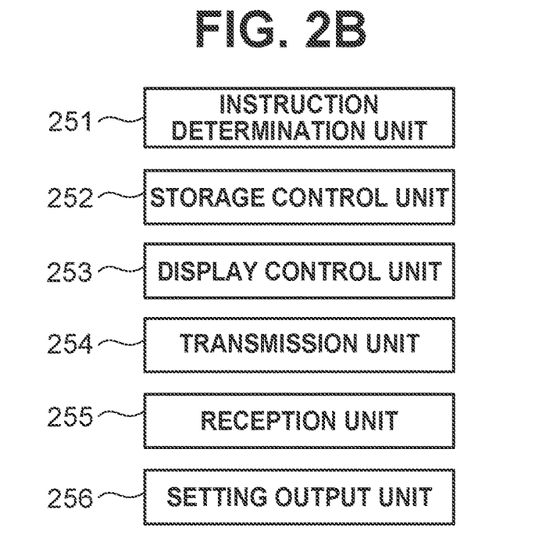

FIG. 2B illustrates an example of a software configuration implemented by the control unit 203 reading a program stored in the ROM 204. An instruction determination unit 251 determines whether a user has instructed to start a communication function or export a communication setting by using a button or the like of the operation unit 207. A storage control unit 252 controls the storage unit 206 to store data and read data into the RAM 205.

A display control unit 253 controls the display unit 208 to perform various kinds of display processing. A transmission unit 254 transmits a request and data to the outside using the packet transmission/reception unit 210 and the wireless LAN control unit 201. A reception unit 255 receives a response and data from the outside using the packet transmission/reception unit 210 and the wireless LAN control unit 201. A setting output unit 256 outputs a communication setting stored in the ROM 204 to the outside.

All the functional blocks illustrated in FIGS. 2A and 2B are related to each other in terms of software or hardware. The above functional blocks are simply examples, and a plurality of functional blocks may constitute one functional block. Alternatively, any of the functional blocks may be further divided into a plurality of blocks that performs a plurality of respective functions. The control unit 203 may first load the control program, which is stored in the ROM 204, into the RAM 205 and then execute the control program.

Communication Setting

Figure 3:
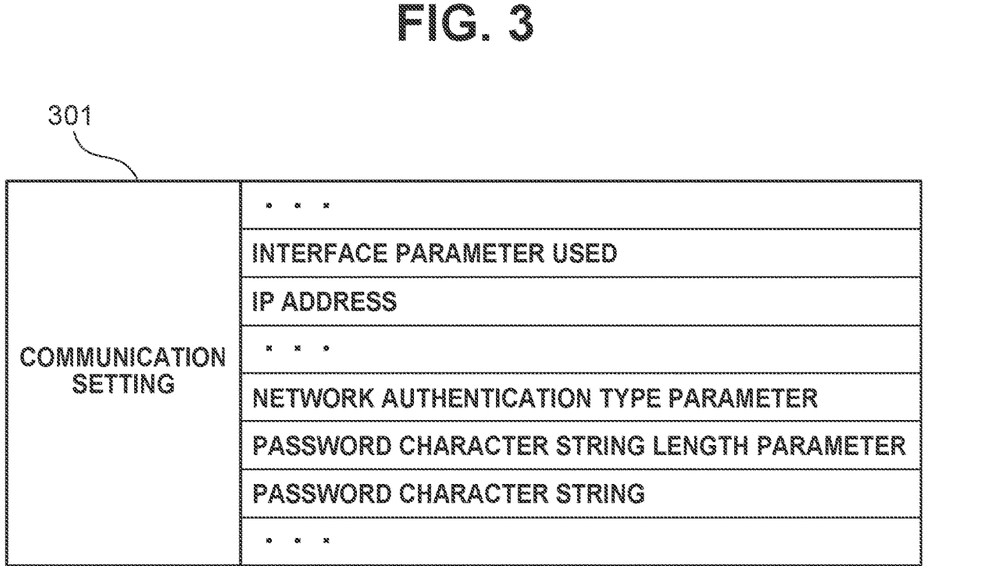
FIG. 3 illustrates an example of a communication setting of a digital camera.

Next, a communication setting stored in the ROM 204 will be described. A communication setting 301 illustrated in FIG. 3 is a group of communication setting parameters used by the digital camera 101 or 102 to perform communication with an external apparatus. The group of communication setting parameters includes various communication parameters including an authentication type parameter, which will be described below.

These parameters include interface information used by a wired LAN and a wireless LAN, a connection destination IP address, and a network authentication type parameter relating to a wireless security standard. The present parameters also include information for performing communication with an external apparatus, and examples of the information include a password character string length parameter and a password character string.

Figure 4:
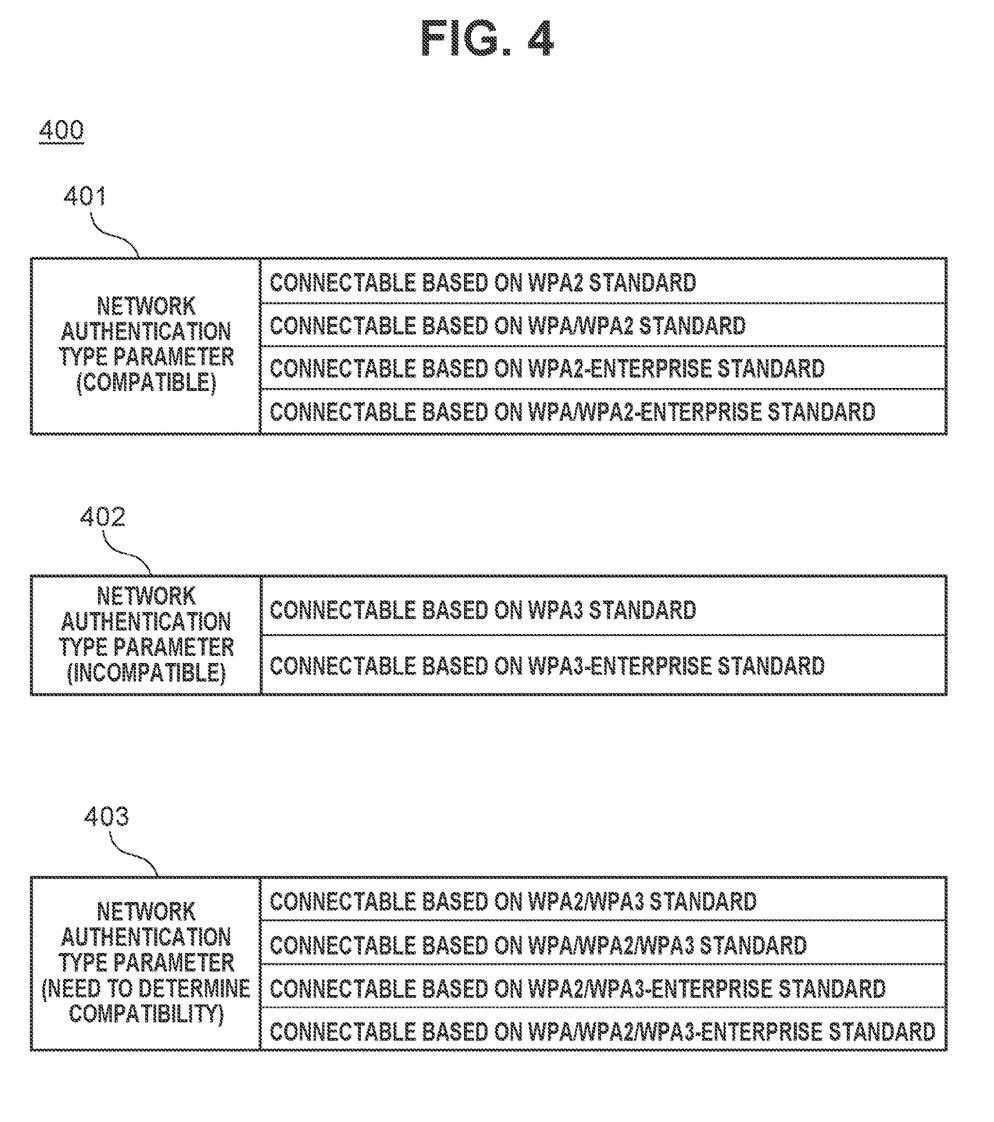
FIG. 4 illustrates examples of a network authentication type parameter included in the communication setting.

FIG. 4 illustrates examples of parameter values of the network authentication type parameter. In the present exemplary embodiment, the network authentication type parameters are setting values indicating wireless security standards (authentication types) that the digital camera 101 or 102 can use when performing wireless LAN communication.

In the present exemplary embodiment, three types of wireless security standards, which are WPA, WPA2, and WPA3 standards, can be set in the network authentication type parameter, and the parameter values indicate usable or unusable standards in combination. The network authentication type parameters also specify an operation mode of a wireless security standard used when the digital camera 101 or 102 performs wireless LAN communication.

Specifically, the network authentication type parameters specify whether to use a personal mode or an enterprise mode of a WPA standard. The network authentication type parameters illustrated in a table 401 are parameter types indicating combinations of the WPA and WPA2 standards, which are compatible with a specific importing apparatus. In other words, the table 401 indicates that, while both the WPA and WPA2 standards are supported, the WPA3 standard is not supported.

The network authentication type parameters illustrated in a table 402 are parameter type that correspond to the WPA3 standard, which is incompatible with the specific importing apparatus but compatible with other specific importing apparatus. In other words, the table 402 indicates that, while the WPA3 standard is supported, the WPA and WPA2 standard are not supported.

The network authentication type parameters illustrated in a table 403 represent parameter types indicating combinations of the WPA3 standard, which is incompatible with the specific importing apparatus but compatible with the other specific importing apparatus, and the WPA and WPA2 standards, which are compatible with the specific importing apparatus. In other words, the table 403 indicates that all the WPA, WPA2, and WPA3 standards are supported.

Figure 5:
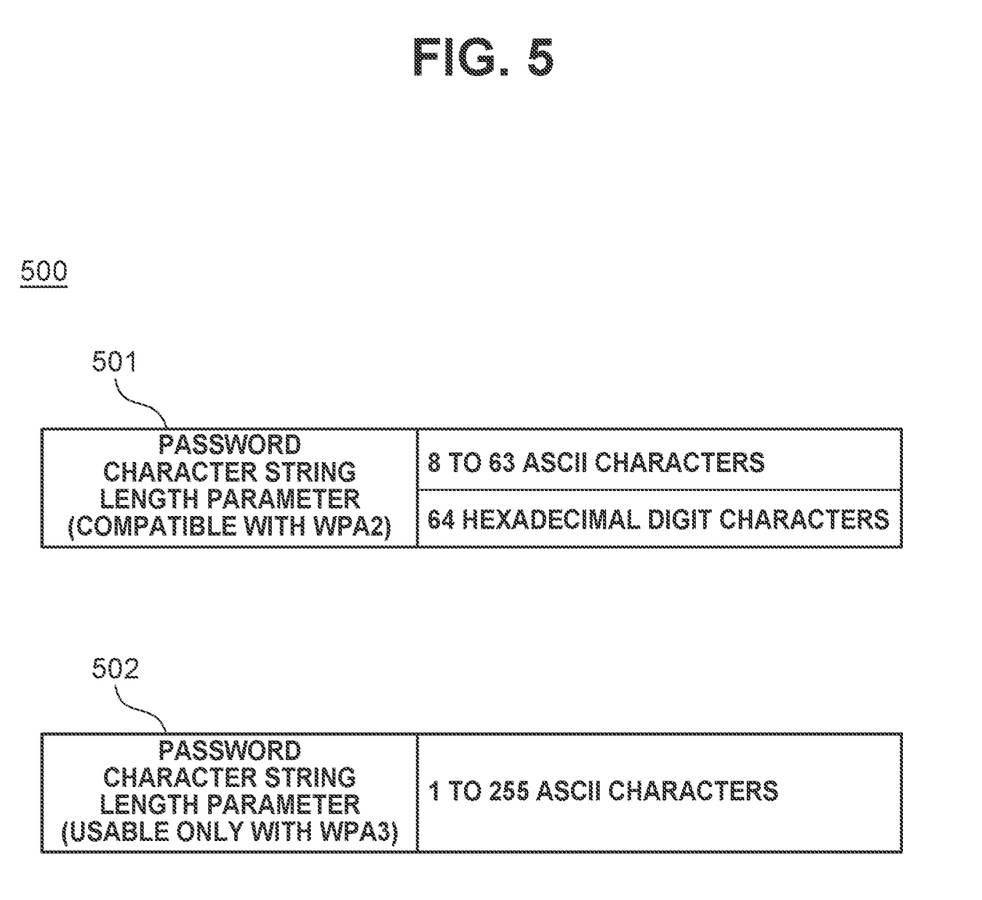
FIG. 5 illustrates examples of a password character string length parameter included in the communication setting.

FIG. 5 illustrates examples of parameter values of the password character string length parameter. In the present exemplary embodiment, the password character string length parameter is a setting value indicating the length of a password used in communication based on a wireless security standard specified by the network authentication type parameter described above and a format in which the password is stored in the communication setting 301. Specifically, this format indicates whether the password is specified as binary data or as an American Standard Code for Information Interchange (ASCII) character string and also indicates the range of possible lengths for the password.

The password character string length parameters illustrated in a table 501 indicate password types that are usable in the WPA/WPA2 standard. A password character string length parameter illustrated in a table 502 indicates a password type usable in the WPA3 standard. One of the parameters illustrated in the tables 401 to 403 is selected as the network authentication type parameter and one of the parameters illustrated in the tables 501 and 502 as the password character string length parameter. The selected parameters constitute the communication setting 301.

Flow of Processing

Hereinafter, processing performed by the digital camera 101 according to the present exemplary embodiment will be described with reference to FIG. 6. The processing is started when the control unit 203 of the digital camera 101 executes a program stored in the ROM 204 and when the user selects export processing of a communication setting of the digital camera 101 via the operation unit 207.

First, in step S601, the control unit 203 determines whether the network authentication type parameter included in the communication setting subjected to the export processing is included in the table 403. As a result of the determination, if the parameter is included in the table 401 or the table 402 (NO in step S601), since the parameter is usable by the importing apparatus or unusable by the importing apparatus, the processing proceeds to step S602. In step S602, the control unit 203 performs the export processing of the communication setting directly (that is, without performing replacement processing, which will be described below).

The exported communication setting can be read by the digital camera 102. Specifically, if the export processing has been performed with a parameter included in the above table 401, which does not indicate the WPA3 as a usable standard, the digital camera 102 can read the communication setting. However, if the export processing has been performed with a parameter included in the table 402, which indicates the WPA3 as a usable standard, the digital camera 102 cannot read the communication setting.

In step S601, if the parameter is included in the table 403 (YES in step S601), the importing apparatus not supporting the WPA3 standard desires to use the exported parameter as a parameter for the WPA2 standard, so that the processing proceeds to step S603. In step S603, password character string length parameter determination processing is performed.

In step S603, the control unit 203 determines whether the password character string length parameter of the communication setting is included in the table 502. If the parameter is included in the table 501 (NO in step S603), since the password character string length parameter is compatible with the WPA2 standard, the importing apparatus can establish a connection based on the WPA2 standard. Thus, in step S604, the control unit 203 performs replacement processing on the currently set network authentication type parameter. Thereafter, the control unit 203 performs the export processing in step S602.

Figure 6:
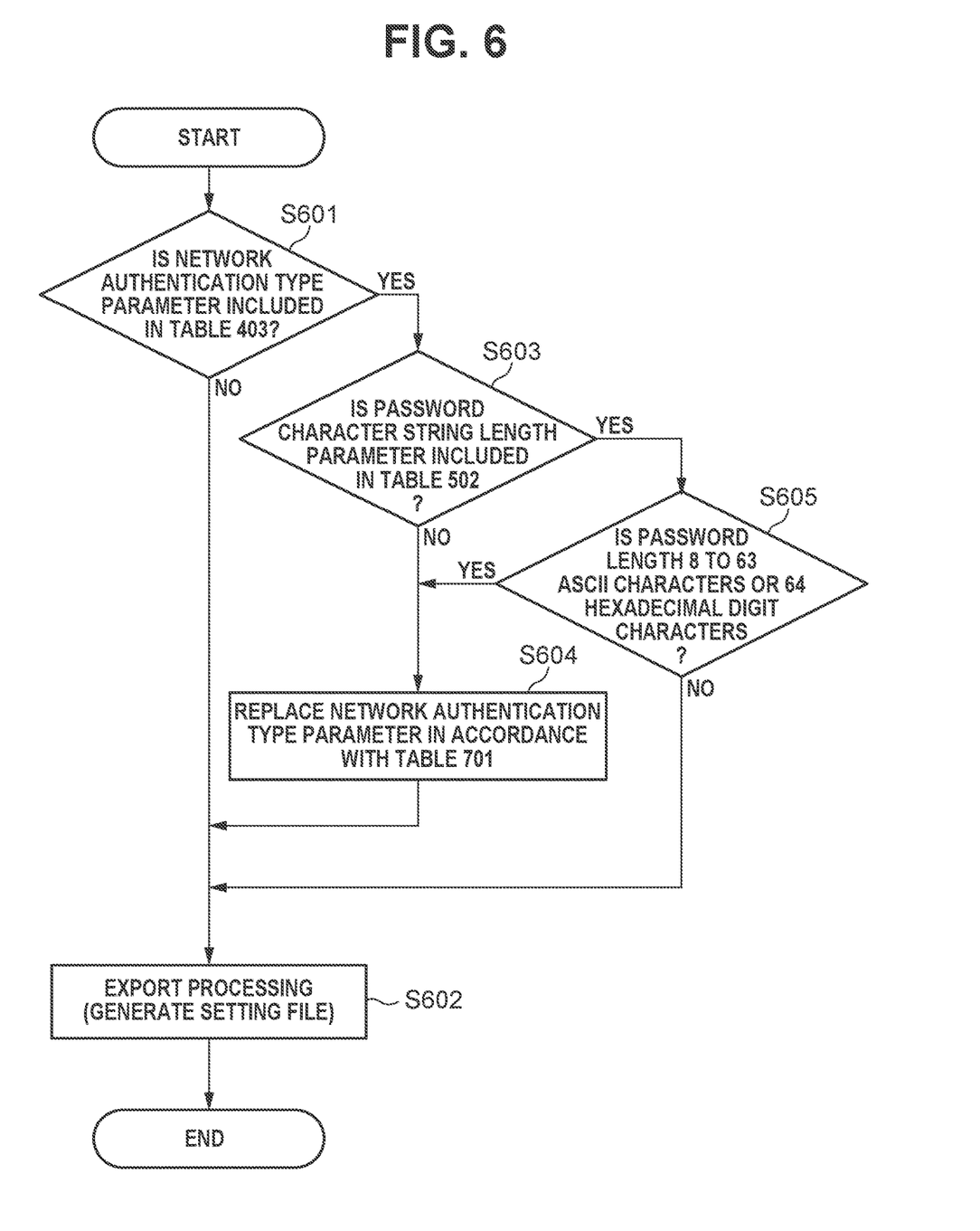
FIG. 6 is a flowchart illustrating an example of communication setting export processing.
Figure 7:
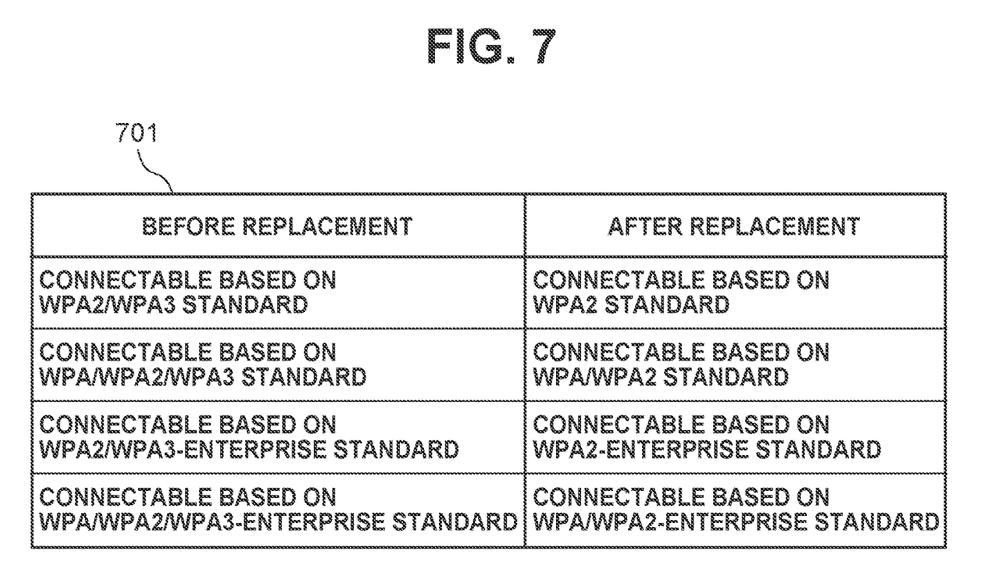
FIG. 7 illustrates examples of replacement processing of a network authentication type parameter.

FIG. 7 illustrates an example of the replacement processing. The network authentication type parameter value to be exported is replaced by a value that does not include the WPA3 standard in accordance with a table 701. Since the communication setting exported in step S602 after the replacement processing does not include the WPA3 parameter, the digital camera 102 can read the communication setting.

The replaced network authentication type parameter value is applied only to the export processing, and the replacement processing is not performed on the parameter included in the communication setting stored in the ROM 204. In step S603, if the password character string length parameter is not included in the table 501 but included in the table 502 (YES in step S603), the processing proceeds to step S605. In step S605, the control unit 203 checks the password character string.

If the password character string length parameter is a parameter indicating "1 to 255 ASCII characters" as illustrated in the table 502 and if the actual password character string is 8 to 63 ASCII characters or 64 hexadecimal digit characters usable based on the WPA2 standard, a connection can be stablished based on the WPA2 standard. Thus, in step S605, the control unit 203 determines whether the password length is 8 to 63 ASCII characters or 64 hexadecimal digit characters.

If the password length is 8 to 63 ASCII characters or 64 hexadecimal digit characters (YES in step S605), the processing proceeds to step S604. In step S604, the replacement processing is performed on the currently set network authentication type parameter. Then in step S602, the export processing is performed. In step S605, if the password length is not 8 to 63 ASCII characters or 64 hexadecimal digit characters (NO in step S605), the processing proceeds to step S602. In step S602, the export processing of the communication setting is performed.

The present invention has thus been described in detail based on the above exemplary embodiment. However, the present invention is not limited to this specific exemplary embodiment, and various modifications obtained without departing from the scope of the present invention are also included in the present invention.

For example, in the above exemplary embodiment, the processing in FIG. 6 is performed after the user selects the export processing of the communication setting, regardless of the type of the export destination apparatus (i.e., importing apparatus). However, alternatively, before the network authentication type parameter included in the communication setting subjected to the export processing is determined in step S601, the user may be asked to select an apparatus as the export destination (output destination) apparatus, and it may be determined whether to perform the replacement processing described above based on the selected apparatus.

Figure 8:
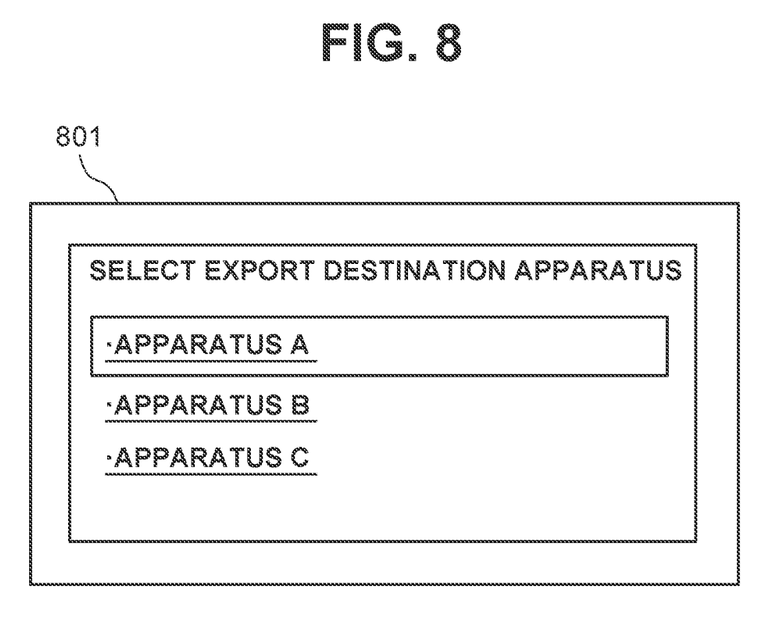
FIG. 8 is an example of a user interface for selecting an export destination apparatus.
Figure 9:
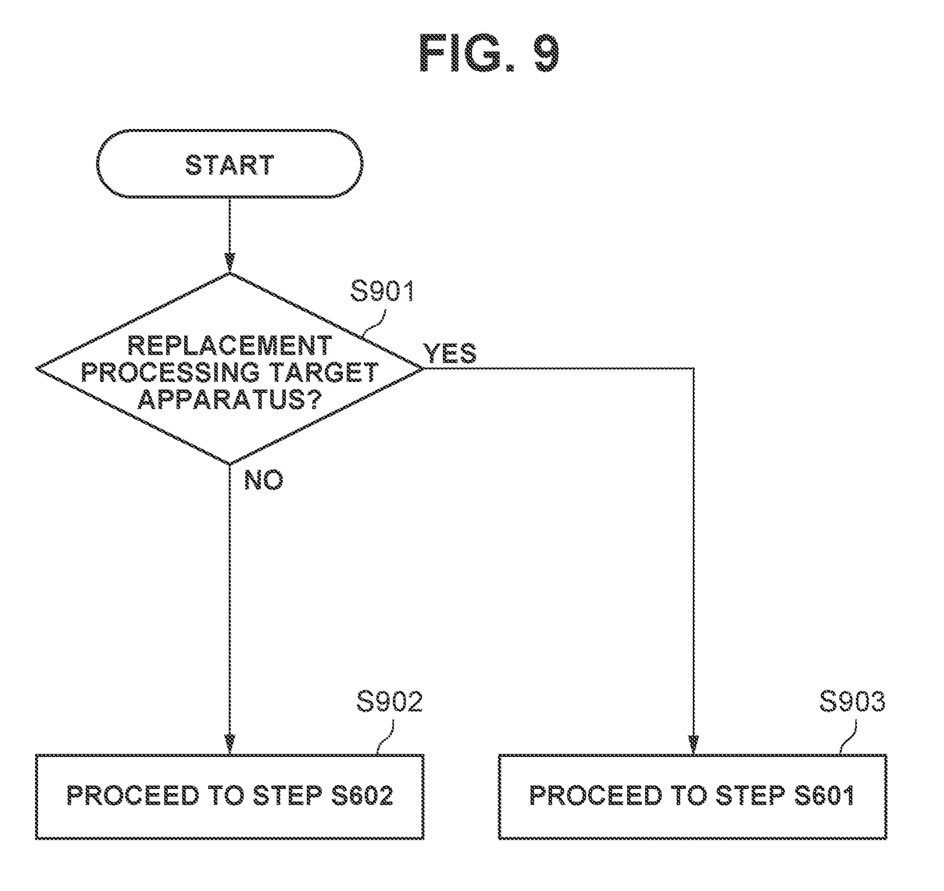
FIG. 9 is a flowchart illustrating an example of the communication setting export processing in a case where an export destination apparatus is selected.

FIG. 8 illustrates a user interface 801 as an example of a user interface for selecting an export destination apparatus, and FIG. 9 is an example of a flowchart of processing performed when an export destination apparatus is selected.

The user interface 801 is displayed after the user selects the export processing of the communication setting, and the user is asked to select an apparatus as the export destination apparatus.

It is assumed here that an apparatus A is an apparatus of the same type as the digital camera 101 and does not need the parameter replacement processing and apparatuses B and C are apparatuses of a different type from the digital camera 101 and can be compatible with the communication setting of the digital camera 101 by performing the parameter replacement processing. When the user selects any of the displayed export destination apparatuses, then in step S901, the control unit 203 determines whether the parameter replacement determination processing is to be performed on the selected apparatus.

In step S901, if the apparatus A, which is the same type of the digital camera 101 and does not need the parameter replacement processing, is selected (NO in step S901), the processing proceeds to step S902, and then the processing in step S602 and subsequent steps is performed. On the other hand, in step S901, if the apparatus B or the apparatus C, which is a different type of apparatus and needs the parameter replacement processing, is selected (YES in step S901), the processing proceeds to step S903, and then the processing in step S601 and subsequent steps is performed. In this way, the parameter replacement determination processing can be omitted for an apparatus that does not need the determination processing. This modification is included in the scope of claims of the present invention.

In addition, in the above exemplary embodiment, in a case where the replacement of the parameter has been performed before the export processing, a configuration may be provided in which the user is notified that the replacement processing has been performed via the user interface or the like after the export processing in step S602. This modification is included in the scope of claims of the present invention.

Moreover, in the above exemplary embodiment, combinations of the WPA standard, the WPA2 standard and the WPA3 standard are described as examples of the network authentication type parameters used for the determination in step S601. However, the combinations in the present exemplary embodiment are not limited to these examples. For example, a standard that may be released in the future that is upward compatible with the existing WPA3 standard, or a wireless security standard that is not compatible with WPA3 standard or earlier versions of a security standard (i.e., WPA/WPA2 standard) can be considered to be included in the parameter combinations.

Figure 10:
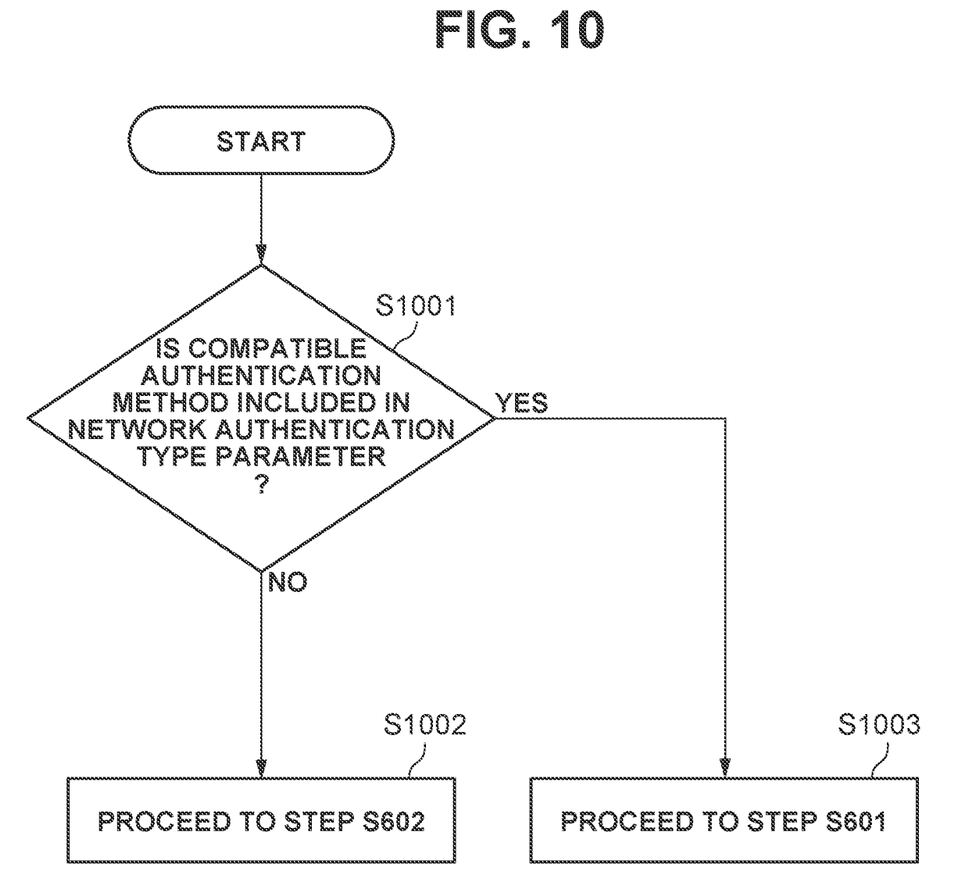
FIG. 10 is a flowchart illustrating an example of the communication setting export processing in a case where it is determined whether a compatible wireless security standard is included in a network authentication type parameter.

In such a case, for example, as illustrated in FIG. 10, step S1001 may be performed prior to step S601. In step S1001, it is determined whether the wireless security standards included in the network authentication type parameters include combinations of wireless security standards incompatible with the specific importing device. If combinations of wireless security standard incompatible with the specific importing device is not included (NO in step S1001), the processing proceeds to step S1002, and step S602 may be performed without performing the subsequent determinations.

In addition, if the password length is not 8 to 63 ASCII characters or 64 hexadecimal digit characters in step S605, the processing in step S602 is performed without performing the parameter replacement.

In this case, in a case where the communication setting is in an infrastructure mode, there is no need to change the password. This is because the password depends on an opposing apparatus such as an access point, and if the setting is changed, the exporting apparatus cannot connect to the opposing apparatus. In contrast, in a case where the communication setting is in an access point mode, the password is the password that the digital camera 101 has. Therefore, usability is improved by converting or resetting the password into a password supported by the WPA2.

Figure 11:
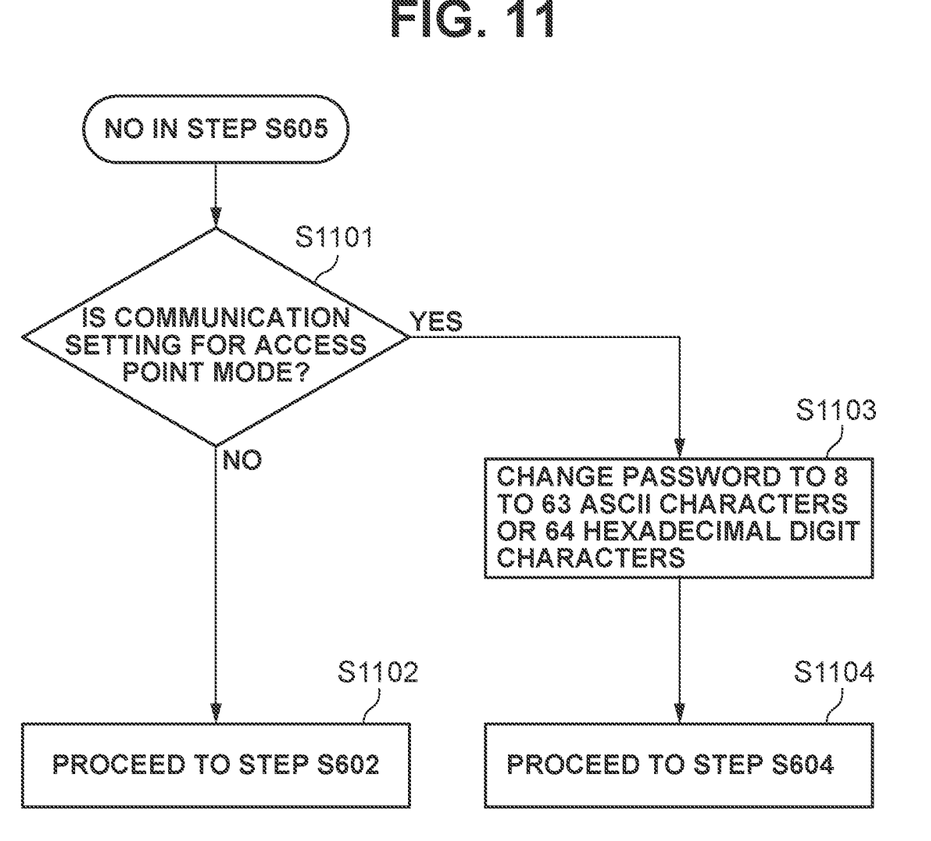
FIG. 11 is a flowchart illustrating an example of the communication setting export processing in a case where the communication setting is an access point setting.

As illustrated in FIG. 11, if the password length is not 8 to 63 ASCII characters or 64 hexadecimal digit characters in step S605 (NO in step S605), the processing proceeds to step S1101. In step S1101, the control unit 203 determines whether the communication setting is in the access point mode. If the communication setting is not a setting in the access point mode (NO in step S1101), the processing proceeds to step S1102, and then the processing in step S602 is performed. In contrast, if the communication setting is in the access point mode (YES in step S1101), the processing proceeds to step S1103. In step S1103, the password is changed to 8 to 63 ASCII characters or 64 hexadecimal digit characters. The processing proceeds to step S1104, and then the processing proceeds to step S604. In step S604, the control unit 203 performs the replacement processing on the network authentication type parameter.

As described above, in a case where the communication setting is in the access point mode, the communication setting compatible with the importing apparatus can be exported by changing the password. In step S1103, the password may be automatically changed, and the user may be notified of the change of the password via the user interface. Further, a configuration may be provided in which the user is asked to directly enter a new password, and this modification is included in the scope of claims of the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all equivalent structures and functions.

This application claims the benefit of Japanese Patent Application No. 2021-088228, filed May 26, 2021, which is hereby incorporated by reference herein in its entirety.

What is claimed is:

1. A communication apparatus that performs wireless communication with an external apparatus, the communication apparatus comprising:
   at least one memory that stores a set of instructions; and
   at least one processor that executes the instructions, the instructions, when executed, causing the communication apparatus to perform operations comprising:
   storing a communication setting that includes an authentication type parameter indicating an authentication type supported for the wireless communication in a storage unit;
   performing a modification analyzing process to analyze the authentication type parameter included in the stored communication setting in accordance with a predetermined algorithm to determine whether the authentication type parameter indicates support for both a first authentication type and a secondary authentication type, where the secondary authentication type is upward compatible with the first authentication type, and to replace the authentication type parameter with a modified authentication type parameter indicating support exclusively for the first authentication type; and
   outputting a setting file that includes the communication setting, the setting file being configured such that another communication apparatus which does not support the secondary authentication type is capable of performing a setting import process using the outputted setting file.

2. The communication apparatus according to claim 1, wherein in the outputting, the setting file is output to a memory card attached to the communication apparatus, and
   wherein the memory card in which the setting file is stored is capable of being attached to the other communication apparatus, and the other communication apparatus, to which the memory card storing the setting file is attached, imports the communication setting based on the stored setting file.

3. The communication apparatus according to claim 2, wherein the communication apparatus is a digital camera and the other communication apparatus is another digital camera.

4. The communication apparatus according to claim 1, wherein the first authentication type is Wi-Fi Protected Access (WPA) or Wi-Fi Protected Access II (WPA2), and the secondary authentication type is Wi-Fi Protected Access III (WPA3).

5. The communication apparatus according to claim 4, wherein the modified authentication type parameter is Wi-Fi Protected Access (WPA) and/or Wi-Fi Protected Access II (WPA2).

* * * * *